US012694796B2

(12) United States Patent
Wythe

(10) Patent No.: US 12,694,796 B2
(45) Date of Patent: Jul. 28, 2026

(54) VEHICLE CONTROLLER

(71) Applicant: BAE SYSTEMS PLC, London (GB)

(72) Inventor: Robert Graham Wythe, Frimley (GB)

(73) Assignee: BAE SYSTEMS PLC, London (GB)

( * ) Notice: Subject to any disclaimer, the term of this patent is extended or adjusted under 35 U.S.C. 154(b) by 181 days.

(21) Appl. No.: 18/020,321

(22) PCT Filed: Jul. 21, 2021

(86) PCT No.: PCT/GB2021/051867
§ 371 (c)(1),
(2) Date: Feb. 8, 2023

(87) PCT Pub. No.: WO2022/034282
PCT Pub. Date: Feb. 17, 2022

(65) Prior Publication Data
US 2023/0305558 A1     Sep. 28, 2023

(30) Foreign Application Priority Data
Aug. 10, 2020     (GB) ...................................... 2012397

(51) Int. Cl.
*G08G 5/80*          (2025.01)
*B64U 10/13*         (2023.01)
(Continued)

(52) U.S. Cl.
CPC ............... *G08G 5/80* (2025.01); *B64U 10/13* (2023.01); *G05D 1/0022* (2013.01); *G05D 1/101* (2013.01);
(Continued)

(58) Field of Classification Search
CPC .... G08G 5/045; G08G 5/0017; G08G 5/0039; G08G 5/0013; G08G 5/0026;
(Continued)

(56) References Cited

U.S. PATENT DOCUMENTS

| | | | | |
|---|---|---|---|---|
| 9,996,079 B2 * | 6/2018 | Magy | ................... | G05D 1/0022 |
| 2014/0214239 A1 | 7/2014 | Bruck et al. | | |

(Continued)

FOREIGN PATENT DOCUMENTS

| | | |
|---|---|---|
| JP | 2020102679 A | 7/2020 |
| KR | 101897597 B1 | 9/2018 |

OTHER PUBLICATIONS

GB Search Report dated Jan. 22, 2021 issued in GB 2012397.2.
International Search Report dated Sep. 28, 2021 issued in PCT/GB2021/051867.

*Primary Examiner* — Anne Marie Antonucci
*Assistant Examiner* — Jodi Jones
(74) *Attorney, Agent, or Firm* — Scully, Scott, Murphy & Presser, P.C.

(57)          ABSTRACT
An apparatus for controlling an unmanned vehicle is described. The apparatus comprises: a receiver for receiving a first vehicle control signal from a remote controller; a memory for storing a route for the vehicle to follow; and a processor. The processor is configured to: determine characteristics of the first vehicle control signal; and generate a second vehicle control signal, wherein the second vehicle control signal comprises an instruction for the vehicle to perform a manoeuvre to follow the route. The apparatus further comprises a transmitter configured to transmit the second vehicle control signal, arranged to have the determined characteristics, to the vehicle. A system and method for controlling an unmanned vehicle are also described.

21 Claims, 3 Drawing Sheets

(51) Int. Cl.
     *G05D 1/00*           (2024.01)
     *G08G 5/20*           (2025.01)
     *G08G 5/34*           (2025.01)

(52) U.S. Cl.
     CPC ................. *G08G 5/20* (2025.01); *G08G 5/34*
            (2025.01); *B64U 2201/20* (2023.01); *G05D*
                                           *1/104* (2013.01)

(58) Field of Classification Search
     CPC .. G08G 5/0043; G08G 5/0052; G08G 5/0069;
               B64U 10/13; B64U 2201/20; G05D
            1/0022; G05D 1/101; G05D 1/104; G05D
               1/0088; G05D 1/0055; G05D 1/0202
     See application file for complete search history.

(56)                    References Cited

U.S. PATENT DOCUMENTS

| | | | | |
|---|---|---|---|---|
| 2016/0155339 | A1* | 6/2016 | Saad | G08G 5/32 |
| | | | | 701/25 |
| 2017/0092138 | A1* | 3/2017 | Trundle | H04K 3/82 |
| 2018/0081355 | A1* | 3/2018 | Magy | G05D 1/0022 |
| 2018/0120829 | A1* | 5/2018 | Price | G05D 1/2246 |
| 2018/0120846 | A1* | 5/2018 | Falk-Pettersen | G06F 3/033 |
| 2018/0329417 | A1* | 11/2018 | Abuhasira | G05D 1/0011 |
| 2019/0104496 | A1 | 4/2019 | Sogo et al. | |
| 2019/0220004 | A1* | 7/2019 | Von Novak, III | B63H 21/21 |
| 2019/0363821 | A1* | 11/2019 | Whittaker | F41H 11/02 |
| 2019/0384285 | A1 | 12/2019 | Harnett et al. | |
| 2020/0110424 | A1* | 4/2020 | Oriani | G05D 1/101 |

* cited by examiner

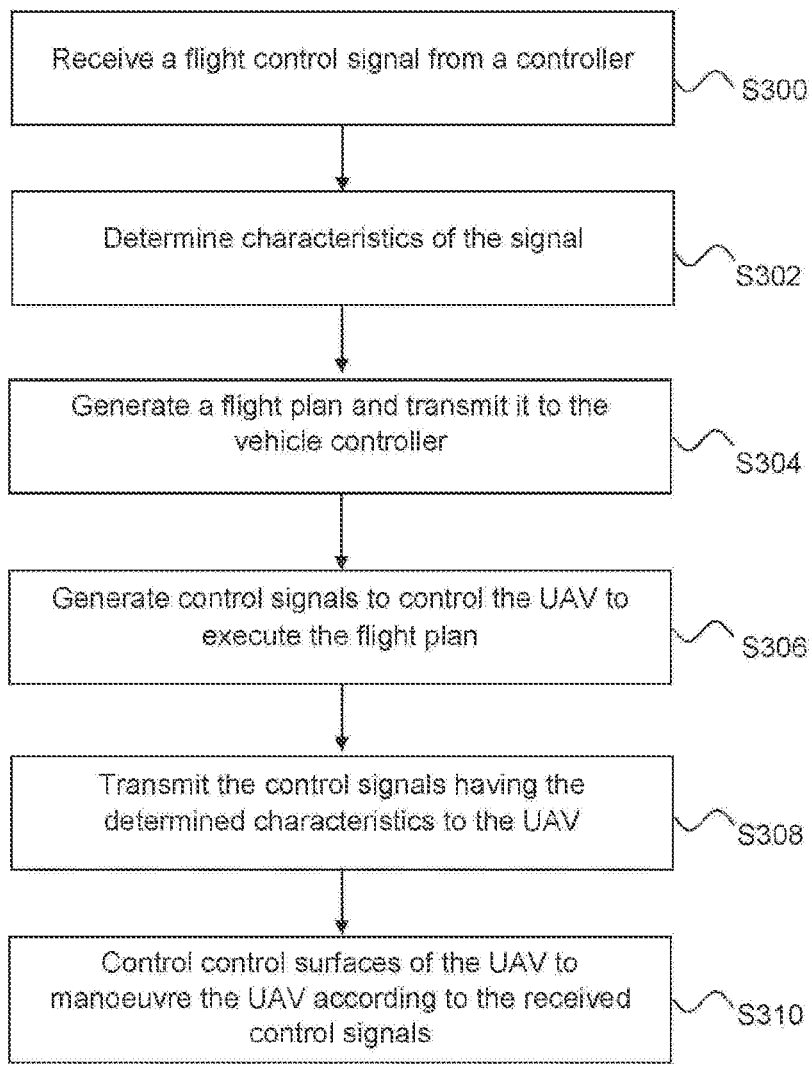

Receive a flight control signal from a controller    S300

Determine characteristics of the signal    S302

Generate a flight plan and transmit it to the vehicle controller    S304

Generate control signals to control the UAV to execute the flight plan    S306

Transmit the control signals having the determined characteristics to the UAV    S308

Control control surfaces of the UAV to manoeuvre the UAV according to the received control signals    S310

Figure 3

VEHICLE CONTROLLER

FIELD

The present disclosure relates to an apparatus for controlling an unmanned vehicle, particularly but not exclusively an unmanned aerial vehicle. The present disclosure also relates to a system for controlling an unmanned vehicle and a method of controlling an unmanned vehicle.

BACKGROUND

With the advent of commercially-available unmanned aerial vehicles (UAVs), it is becoming increasingly difficult to prevent collisions between them. While some UAVs, particularly larger or bespoke UAVs, operate under the control of an integrated programmable autopilot, most commercial-off-the-shelf (COTS) UAVs are not readily programmable and take input from a handheld flight controller operated by a user.

It would be advantageous to provide these COTS UAVs, typically controlled by a user, with a degree of autonomy in order to prevent collisions and/or reduce burden on the user where a plurality of UAVs are being controlled by that user.

SUMMARY

According to a first aspect of the present disclosure, there is provided an apparatus for controlling an unmanned vehicle, the apparatus comprising:

a receiver for receiving a first vehicle control signal from a remote controller;

a memory for storing a route for the vehicle to follow;

a processor configured to:

determine characteristics of the first vehicle control signal; and generate a second vehicle control signal, wherein the second vehicle control signal comprises an instruction for the vehicle to perform a manoeuvre to follow the route; and a transmitter configured to transmit the second vehicle control signal, arranged to have the determined characteristics, to the vehicle.

Advantageously, the apparatus enables autonomy of an unmanned vehicle with no inherent autonomy and/or where the unmanned vehicle is linked to a single handheld controller.

The processor may be configured to generate a plurality of second vehicle control signals, each defining a manoeuvre for the vehicle, which, when executed, cause the vehicle to follow the route.

The characteristics may include at least one of a channel and a frequency on which the first vehicle control signal is transmitted from the remote controller.

The apparatus may comprise an input for receiving the route from an external source. The input may be a wireless interface, wired interface, or a user input such as a touchscreen. The route may be received over the air from a server.

The apparatus may comprise a navigation system for generating navigation data, the transmitter may be arranged to transmit the navigation data to a server, and the receiver may be arranged to receive the route from the server. The navigation system may comprise an inertial measurement system and/or a satellite navigation system.

The processor may be arranged to determine the route for the vehicle to follow and store the route in the memory.

The apparatus may comprise at least one sensor, wherein determining the route for the vehicle to follow may comprise modifying a stored route based on data generated by the at least one sensor. The sensor may be configured to detect at least one object in the path of the unmanned vehicle, and the processor may be configured to modify the stored route such that the unmanned vehicle performs a set of manoeuvres to avoid a detected object. Alternatively, the sensor may be configured to detect at least one object in the path of the unmanned vehicle, and the processor may be configured to transmit the location of the at least one object to the server. The sensor may be at least one of an optical camera, a laser range finder, an infrared camera, a spectral imaging device, a radar, or a sonar. The sensor may comprise image recognition software for identifying types of objects.

The processor may be arranged to receive a plurality of routes, determine the route for the vehicle to follow by performing route deconfliction on the plurality of routes, and store the determined route in the memory.

The apparatus may comprise a coupling means for coupling the apparatus to an outside surface of the vehicle. The coupling means may comprise an adhesive layer. Alternatively, the coupling means may comprise a hook and loop material, a strap, chain, magnet or other device for securing the vehicle controller to the vehicle.

According to a second aspect of the present disclosure, there is provided a system for controlling an unmanned vehicle, the system comprising:

at least one apparatus according to the first aspect; and at least one unmanned vehicle for receiving a control signal from the apparatus and carrying out a manoeuvre instructed by the second vehicle control signal, the at least one apparatus being coupled to the respective at least one unmanned vehicle.

The at least one unmanned vehicle may comprise an unmanned aerial vehicle.

The system may comprise a mobile device arranged to transmit the route for the vehicle to follow to the apparatus.

The system may comprise a server configured to transmit each of a plurality of routes to the respective apparatus coupled to the unmanned vehicle that will follow the route.

The server may comprise a route deconfliction algorithm for performing route deconfliction on a plurality of routes and generating the route for the respective unmanned vehicle to follow.

The server may be configured to retrieve object data and use the object data to perform the route deconfliction, such that the unmanned vehicle does not collide with objects associated with the object data when following the route. The server may be configured to search a database to retrieve the object data. The server may be configured to search the database by accessing the internet. Object data may include architectural and/or terrain data, such as heights and locations of buildings and mountains. Object data may include air traffic data, such as the flight paths of aircraft, or ADS-B data.

The at least one apparatus may be arranged to transmit navigation data relating to the respective unmanned vehicle to the server;

the server being arranged to use the navigation data relating to a plurality of unmanned vehicles to extrapolate routes for those vehicles, wherein performing route deconfliction comprises generating a route for an unmanned vehicle which does not intersect any of the extrapolated routes.

According to a third aspect of the present disclosure, there is provided a method of controlling an unmanned vehicle, the method comprising:

receiving a first vehicle control signal from a remote controller;

storing a route for the vehicle to follow;

determining characteristics of the first vehicle control signal;

generating a second vehicle control signal, wherein the second vehicle control signal comprises an instruction for the vehicle to perform a manoeuvre to follow the route; and transmitting the second vehicle control signal, arranged to have the determined characteristics, to the vehicle.

The method may comprise mechanically coupling a vehicle controller to the vehicle.

The method may comprise determining the frequency and/or channel on which the first vehicle control signal was transmitted.

The method may comprise receiving the route for the vehicle to follow wirelessly from a server. The method may comprise transmitting navigation data to the server and using the navigation data to plan the route for the vehicle to follow.

The method may comprise determining the route for the vehicle to follow by performing route deconfliction on a plurality of routes and storing the determined route.

The method may comprise retrieving object data and using the object data to perform route deconfliction, such that the unmanned vehicle does not collide with objects associated with the object data. Retrieving object data may include searching a database. Object data may include architectural and/or terrain data, such as heights and locations of buildings and mountains. Object data may include air traffic data, such as the flight paths of aircraft, or ADS-B data.

The method may comprise:

sensing at least one object in the path of the unmanned vehicle using at least one sensor; and determining the route by modifying the stored route based on the location of the sensed object such that the unmanned vehicle does not collide with the at least one object. The method may comprise determining a likelihood of collision with the sensed object. The method may involve determining a speed and direction of travel of the at least one object.

The method may comprise receiving the second vehicle control signal and controlling the unmanned vehicle to perform the manoeuvre instructed by the second vehicle control signal.

It will be appreciated that features described in relation to one aspect of the present disclosure can be incorporated into other aspects of the present disclosure. For example, an apparatus of the disclosure can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the disclosure will now be described by way of example only and with reference to the accompanying drawings.

FIG. 3 is a flowchart outlining a method of controlling an unmanned aerial vehicle according to an embodiment.

For convenience and economy, the same reference numerals are used in different figures to label identical or similar elements.

DETAILED DESCRIPTION

Generally, embodiments herein relate to a vehicle controller that can be coupled to a "dumb" unmanned vehicle, after manufacture, in order to provide the unmanned vehicle with autonomy. Preferably, the vehicle controller receives a route (i.e. travel plan) from a server for the unmanned vehicle to follow. More preferably, the server is provided with software that prevents collisions with other unmanned vehicles. The unmanned vehicle requires no modification in order to accommodate the vehicle controller, and therefore the vehicle controller is compatible with any unmanned vehicle ordinarily controlled from a control station or handheld device. Therefore, several vehicle controllers may be centrally programmed for the control of several associated unmanned vehicles, negating the need for manual user control of each unmanned vehicle.

Figure 1:
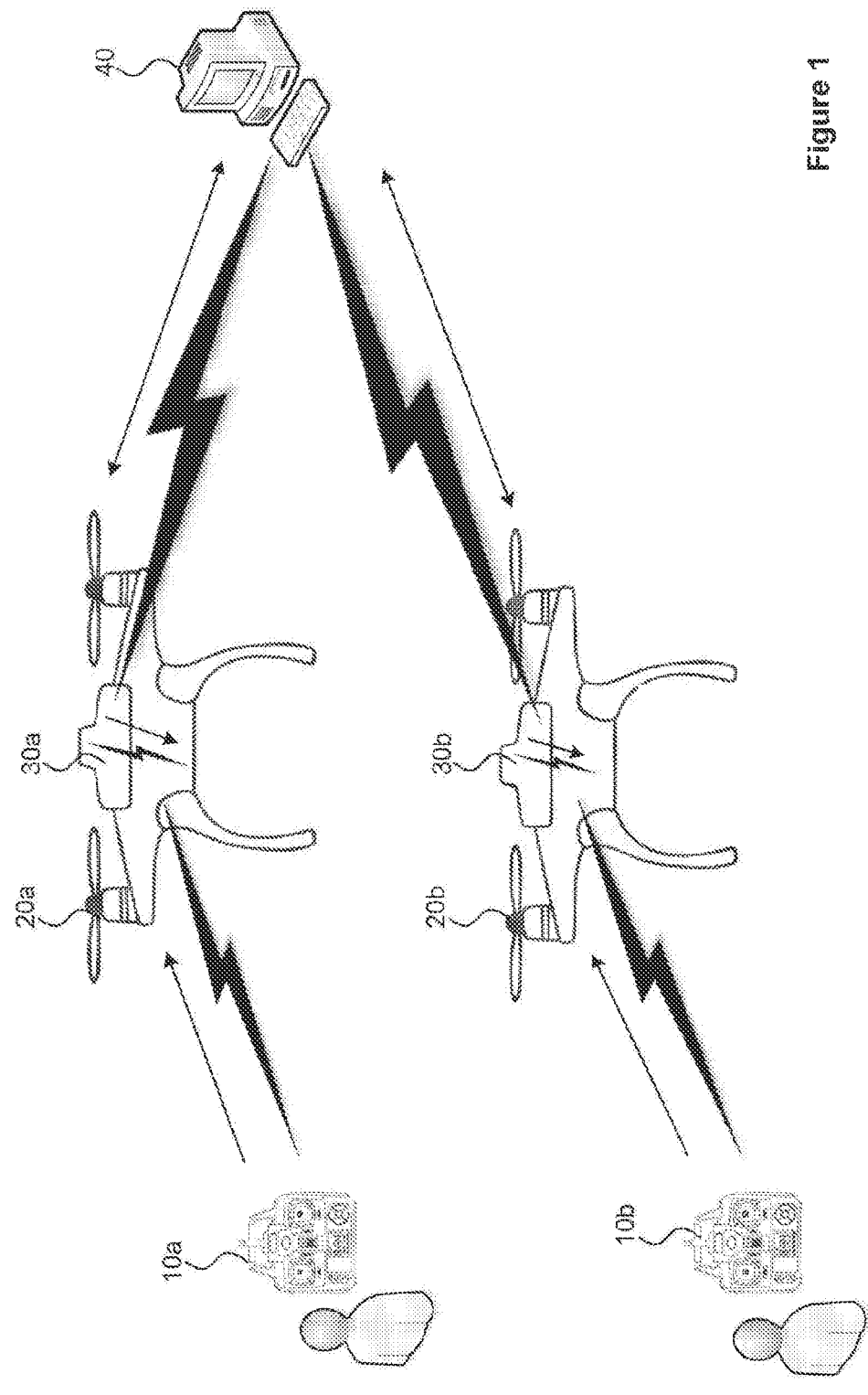
FIG. 1 is a system diagram of a system for controlling an unmanned aerial vehicle, according to an embodiment.

Unmanned aerial vehicles 20a, 20b (generally 20) having respective individual vehicle controllers 30a, 30b (generally 30) coupled thereto are illustrated in FIG. 1. While two UAVs 20 are illustrated, this is not intended to be limiting. There may be only one UAV 20 in the system, or a plurality of UAVs 20 in the system. The unmanned aerial vehicle 20 is in the form of a multicopter (e.g. a quadcopter), which is a typical form-factor for COTS UAVs. While the embodiments that follow will refer to flight paths, flight planning and aircraft, it would be understood this is in relation to specific embodiments and not intended to limit the concept of upscaling autonomy. For example, in other embodiments, the unmanned vehicle may be an unmanned or optionally-manned ground vehicle, space vehicle or naval vessel. Throughout, "unmanned" will be assumed to have a broad definition encompassing optionally-manned vehicles not being operated by a human.

In the illustrated embodiment, in normal operation the unmanned aerial vehicle(s) 20 is/are controlled manually using an associated handheld remote controller 10a, 10b (generally 10). The handheld remote controller 10a, 10b is unique to the respective UAV 20a, 20b. In other words, without modification, the first handheld remote controller 10a could not control the second UAV 20b to which it is not linked. This is because the UAVs 20a, 20b operate on different channels or frequencies to each other. In other embodiments, in normal operation the unmanned aerial vehicle(s) 20 is/are controlled manually by or from a control station. The unmanned aerial vehicle 20 is a commercial-off-the-shelf "drone", and as such is relatively inexpensive and has a limited degree of autonomy, if any. The unmanned aerial vehicle 20 receives a wireless control signal from the remote controller 10, containing instructions to change the heading, orientation, velocity and/or altitude of the unmanned aerial vehicle 20. The remote controller 10 may be a mobile phone, handheld bespoke transmitter, joystick, trackball, desktop computer, or other wireless control device. These instructions are interpreted by a controller on-board the UAV 20 such that it generates corresponding control signals for the unmanned aerial vehicle's flight control surfaces in order to effect the desired manoeuvre.

A vehicle controller 30 is coupled to the UAV 20. The vehicle controller 30 is an independent unit attached to the outside of the UAV 20. The vehicle controller 30 may be coupled to the UAV 20 by any suitable means, such as straps, an adhesive substance, a magnet, hook-and-loop material, a clasp, a bracket, or an elastic band. The vehicle controller 30 may alternatively be heat-bonded or chemically bonded to the UAV 20, although it would be preferred for the vehicle controller 30 to be detachable such that the UAV 20 can return to its original control regime.

The vehicle controller 30 is arranged to generate and transmit its own control signals having the same characteristics as those transmitted by the linked remote controller 10 in order to control the UAV 20 instead of that remote controller 10. The characteristics may include frequency, channel, power and/or amplitude, for example, such that the UAV 20 recognises the vehicle controller 30 to be the remote controller 10. The vehicle controller 30 may be manually programmed to transmit using the appropriate characteristics, or may detect the appropriate characteristics by measuring intercepted signals transmitted by the remote controller 10.

In the illustrated embodiment, a server 40 is in wireless communication with the plurality of vehicle controllers 30. The server 40 may belong to an entity such as a logistics company, national air traffic service or military organisation, having a plurality of UAVs 20 associated with it. The UAVs 20 may be for delivering packages, for example. Alternatively, the UAVs 20 may be communication nodes in a military tactical network.

The server 40 may receive a start point (e.g. the current position of the UAV 20) for a route and a desired end point (e.g. where a package needs to be delivered). The server 40 is arranged to plan a route between the two points. Preferably, the route is planned such that the UAV 20 does not collide with any other UAVs, terrain or objects. However, in a simple embodiment, the route may be planned such that the UAV 20 moves from the start point to the end point "as the crow flies" (i.e. with little deviation from a straight path).

In one embodiment, the vehicle controllers 30 are arranged to transmit navigation data (e.g. their position, velocity and/or heading) to the server 40. The server 40 is arranged to use this navigation data to perform route deconfliction. Route deconfliction may first involve extrapolating a route of each UAV 20 using the respective navigation data. For example, if a UAV 20 is shown to be at a first location at a first time, and its speed and direction of travel are transmitted to the server 40, the server 40 can calculate its position at a second time. Deconfliction may then involve generating new routes for the UAVs 20 that prevent their collision if the original routes are shown to intersect. Alternatively, where original routes are shown to intersect and where the server 40 is provided with a terminal having a user interface, a user may manually generate a new route for each UAV 20 to remove the conflict(s).

The server 40 may also be aware of the locations of other objects (or, in other words, entities), such as manned aircraft, aerostats, storm fronts or terrain features. This data may be received through the internet, via a databus or may be pre-stored. For example, the server 40 may receive map data, such as topography data or architectural data. The map data may indicate the elevation or maximum vertical extent of terrain features (e.g. mountains) or buildings, along with their locations. The map data may be received from a remote server via a communications link, or may be downloaded to a memory on the server 40. The server 40 may also have access to national air traffic data systems, or have an Automatic Dependent Surveillance-Broadcast (ADS-B) input, so that it knows the location and trajectory (or flight paths) of other aircraft. The routes may be generated so as to avoid collision between the UAVs 20 and these objects (in addition to avoiding collision between the UAVs 20 themselves). Alternatively, a user may programme the server 40 with the desired routes for each UAV 20.

Each route is then transmitted back to the vehicle controller 30 coupled to the UAV 20 associated with the respective route. As illustrated, the route is transmitted to the vehicle controller 30 over-the-air. The vehicle controllers 30 may be coupled to the server 40 via a network, for example a wide area network (WAN) or local area network (LAN).

The route is a path through a three-dimensional region of airspace, and therefore may indicate a sequential set of coordinates and altitudes. In other words, the route is a plan for moving a UAV 20 from a start position to a final position. The route may further include the velocity at which the UAV 20 should fly between coordinates, an expected time of arrival at particular coordinates (from which velocity can be calculated), and/or the UAV's (or UAV's camera) orientation at particular coordinates.

In some embodiments, the vehicle controller 30 or server 40 is pre-programmed with a route for the UAV 20 follow. Deviations from this stored route may be transmitted to the server 40 so that adjustments to the UAV 20 can be made to bring it back onto the planned route. Alternatively, the vehicle controller 30 may be configured to determine corrections to bring the UAV 20 back onto the planned route. In other words, the server 40 may be used to plan and store routes, without performing any route deconfliction.

In some embodiments, a user may generate a route using an application on their handheld mobile device (e.g. mobile phone), and transmit that route to the vehicle controller 30 via a wireless communication means such as WiFi or Bluetooth. This route may also be transmitted to and/or stored on the server 40 such that route deconfliction can be performed as explained above (in lieu of or in addition to receiving navigation data at the server 40).

In some embodiments, the vehicle controller 30 may comprise a user interface, such as a touchscreen, for receiving a route from a user. Alternatively, the vehicle controller 30 may comprise a wired interface for receiving a route from a computer or the server 40 as illustrated in FIG. 1. The vehicle controller 30 may instead comprise an interface for receiving a route from a USB stick or external hard drive.

Preferably, the vehicle controller 30 is reprogrammable to receive alternative routes and/or control different UAVs 20. However, the route may be programmed at the time of manufacture of the vehicle controller 30.

Instead of the server 40 performing route deconfliction, the vehicle controller 30 may comprise a route deconfliction algorithm. Here, the vehicle controller 30 may receive one or a plurality of routes. The vehicle controller 30 may also be aware of the locations of other objects to be avoided, such as manned aircraft etc., as explained with reference to the server 40 above. Each route, and/or object data, may be received by any of the mechanisms previously described. The vehicle controller 30 may then calculate a route for the UAV 20 to follow which does not result in collision with another UAV 20 following one of the received routes, or one of the objects.

In one embodiment, the route deconfliction algorithm (such as that used by the server 40 or vehicle controller 30) defines a three-dimensional region of airspace around part of the or each received route. The three-dimensional region of airspace is time-dependent, in that it moves along the route to align with the expected position of the associated aircraft at that point in time. The deconfliction algorithm may then warn a user (for example, with a displayed message) if their intended route intersects one of the other three-dimensional regions so they can replan, or calculates a route to avoid such an event.

In some embodiments, the vehicle controller 30 comprises at least one sensor for determining live situational awareness data. This situational awareness data, as with the map data, may be used to adapt or determine a route for the UAV 20. Live situational awareness data may indicated the presence of another aircraft or object moving into the path of the UAV 20, for example. The sensor may be an optical camera, radar, sonar, hyperspectral imaging device, infrared camera, etc. The sensor may comprise a laser range finder for determining the distance to a detected object. The sensor may comprise image recognition software to identify clouds and other object types. The situational awareness data may be transmitted to the server 40 so that the server 40 can modify the determined route. Modifying a route may involve instructing the UAV 20 to accelerate, such that the object passes behind the UAV 20; slow down; or change direction. The server 40, or a processor on-board the vehicle controller 30, may calculate the speed and direction of travel of the object and the point of likely intersection with the UAV 20 if it remains on the route presently being followed. This may be achieved by monitoring how far the object (or aircraft) travels in a known amount of time. The laser range finder or radar may be used for this purpose. Alternatively to the server 40, the vehicle controller 30 itself may be configured to modify the stored route to control the UAV 20 to avoid the object (or other aircraft).

Figure 2:
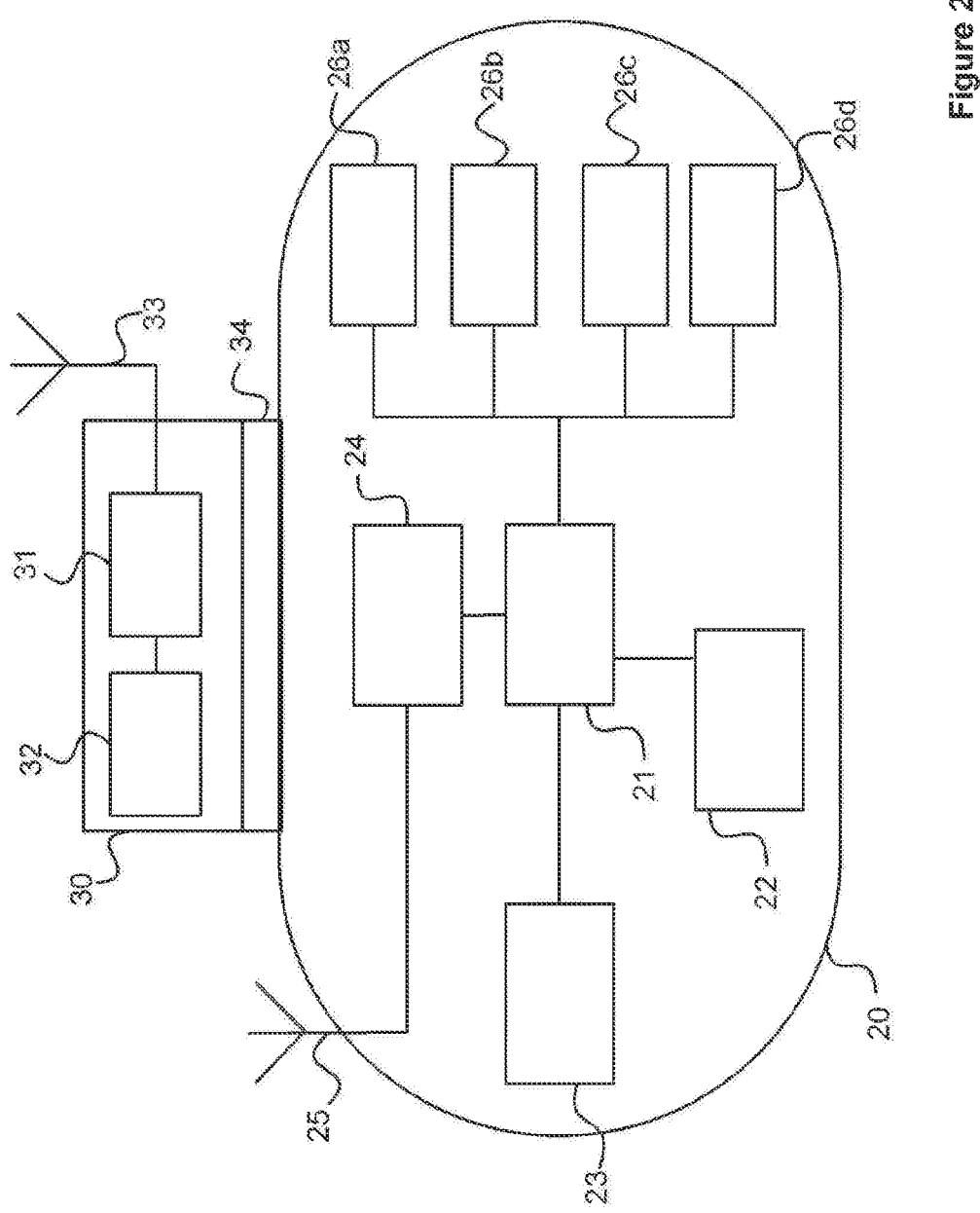
FIG. 2 is a system architecture view of an unmanned aerial vehicle having a vehicle controller coupled thereto, according to an embodiment.

An embodiment of a vehicle controller 30 coupled to a UAV 20 is illustrated in more detail in FIG. 2. Here, the vehicle controller 30 is for storing a predetermined route (i.e. a flight plan) and generating control signals (i.e. control inputs) for controlling the UAV 20 to follow the route. The route is stored in a memory 32. The memory 32 may be a non-volatile memory such as read only memory (ROM), a hard disk drive (HDD) or a solid state drive (SSD). The memory 32 may include random access memory (RAM). RAM is used by a controller 31 of the vehicle controller 30 for the temporary storage of data. The memory 32, in alternative embodiments, may comprise a route deconfliction algorithm used by the controller 31 in planning a route.

In the illustrated embodiment, a route is initially programmed by a user using their mobile device (e.g. mobile phone). The mobile device uses a web app running on a server 40 to receive the route. This initial route is stored on the server 40, which also stores a plurality of other routes each associated with other UAVs 20. These other routes may be received from the same mobile device (i.e. the same user) or a plurality of mobile devices. The server 40 performs route deconfliction on the stored routes to generate a deconflicted route for the UAV 20 to follow. The deconflicted route may be the same as the initial route, if there were no conflicts with other UAVs or objects. This deconflicted route is transmitted to the vehicle controller 30 and stored in the memory 32. The memory 32 may contain a unique identifier, such as a MAC address, serial number or email address, to set the vehicle controller 30 apart from other vehicle controllers with which the server 40 is in communication.

As explained above, in other embodiments, the vehicle controller 30 may determine a route for the UAV 20 to follow based on situational awareness data received from sensors onboard the vehicle controller 30. Therefore, the vehicle controller 30 may include sensors, such as a radar or optical camera, for detecting aerial objects to avoid such as other aircraft or weather patterns. Alternatively, the vehicle controller 30 and UAV 20 may be provided with an electrical interface to allow the vehicle controller 30 to access sensors onboard the UAV 20. This sensor data may be used as part of the route planning process (e.g. by first being transmitted to the server 40), or may be used directly by the vehicle controller 30 to deviate from a route where unexpected obstacles arise.

In some embodiments, the vehicle controller 30 comprises a navigation system, such as an inertial navigation system including a gyroscope and/or compass. The navigation system may alternatively or additionally include a satellite navigation system such as GPS or GLONASS. The navigation system generates navigation data such as the location, heading and velocity of the UAV 20. The navigation data is transmitted to the server 40. A route can then be planned for the UAV 20 using the UAV's current conditions (i.e. location, heading and velocity). The route is transmitted to the associated vehicle controller 30 for storage. Instead of receiving navigation data, the server 40 may predict the present position velocity and heading of the UAV 20 based on time of flight and initial conditions.

The vehicle controller 30 may comprise a data interface. The data interface may be a wired interface such as a serial port, USB interface, or Ethernet interface. The data interface may be a wireless interface such as a Bluetooth, LTE, 5g, 6g, or WiFi module. The data interface is for receiving the or a plurality of routes from the server 40. Alternatively, the vehicle controller 30 may receive the route from a user's mobile device or through a direct input means such as a touchscreen.

The controller 31 is coupled to an antenna 33. The antenna 33 receives (intercepts) control signals transmitted by the handheld remote controller 10, intended for the UAV 20. The controller 31 (or, in some embodiments, a separate signal processor) processes the received control signals to determine the characteristics of signals usually used to control the UAV 20. The controller 31 may comprise a transducer. The controller 31 may comprise a spectrum analyser for determining the frequency of received signals. The controller 31 is not tuned to a specific frequency, and is able to process signals on a range of frequencies in order to determine their frequency (and, in some cases, other characteristics, such as transmission channel). This allows the controller 31 to generate its own control signals for the UAV 20, having the same characteristics as the received signals. Therefore, the vehicle controller 30 can be used to control any UAV 20, rather than being limited to one UAV only during manufacture as in the prior art. In other words, a vehicle controller 30 may be used to retrofit a UAV 20.

The controller 31 may take any suitable form. For instance, it may be a microcontroller, plural microcontrollers, a processor, or plural processors. The controller 31 is arranged to generate control signals for controlling the UAV 20 to manoeuvre to follow the route stored in the memory 32. For example, thirty seconds into the flight, the route may indicate the UAV 20 needs to head on a bearing of 130 degrees north. Knowing the original heading of the UAV 20, the vehicle controller 30 may therefore generate a control signal, thirty seconds into the flight, indicating the UAV 20 to turn left until it is on the indicated heading. Instead of being based on timings, the control signals may be generated according to the position of the UAV 20 relative to the route. A set of control signals may be generated by the controller 31, whereby each control signal defines a manoeuvre, which, if all executed by the UAV 20, causes the UAV 20 to follow the stored route. The control signals are transmitted to the UAV 20 through the antenna 33.

The vehicle controller 30 includes a mechanical interface 34 for coupling the vehicle controller 30 to the UAV 20. The mechanical interface 34, in preferred embodiments, requires no modification of the UAV 20 itself to secure the vehicle controller 30. The mechanical interface 34 may include any suitable securing means, such as an adhesive layer, magnet or a strap that wraps around the body of the UAV 20. The mechanical interface 34 may also include a net or basket, or the like, for suspending the vehicle controller 30 below the UAV 20. The vehicle controller 30 is attached to an outside surface of the UAV 20 by the mechanical interface 34. The surface may, for example, by an upper (dorsal) part of the main body of the UAV 20, as illustrated in FIG. 1. Alternatively, the vehicle controller 30 may be coupled to a side surface or the lower (ventral) part of the main body of the UAV 20. Here, "attached" and "coupled" may not mean literally affixed, rather, the terms are intended to mean "held in place in relatively close proximity to, or touching, the surface", such that the vehicle controller 30 does not fall from the UAV 20 in flight and signals can be transmitted to the UAV 20.

In the illustrated embodiment, the UAV 20 is a commercial-off-the-shelf (COTS) quadcopter aircraft weighing about 15 kg and having diameter of less than 1 metre. However, this is not intended to be limiting, and it would be understood that the vehicle controller 30 may be coupled to an unmanned vehicle of any size or configuration to provide that vehicle with a degree of autonomy. The present invention requires no modification of the UAV 20, and therefore the UAV 20 may be any UAV typical of the prior art. Instead of a UAV 20, the vehicle to be controlled may take the form of an unmanned ground vehicle or naval vessel (including underwater vessels).

The UAV 20 may be solar-electric powered (where the power source is not shown in the Figure). However, in other embodiments, the primary power source of the UAV 20 may be hybrid, battery only, hydrogen, or hydrocarbon based.

The UAV 20 comprises a controller 21. The controller 21 may take any suitable form. For instance, it may be a microcontroller, plural microcontrollers, a processor, or plural processors. The controller 21 is arranged to receive control signals decoded by a radio 24 (i.e. a signal processor). The radio 24 receives the control signals wirelessly through an antenna 25 from the remote controller unless the remote controller 10 is out of range. The control signals contain instructions, which, when executed by the controller 21, cause the UAV 20 to move according to a user input. In some embodiments, instead of being separate components, the functionality of the radio 24 is performed by the controller 21. In preferred embodiments, the radio 24 comprises a transducer tuned to a specific channel and frequency, and is therefore associated with a specific remote controller 10 during manufacture.

The UAV 20 depicted in the Figures is a quadcopter-type unmanned aerial vehicle, with four propulsion units 26a-d that can be adjusted to control pitch/attitude, velocity, orientation, heading and lift of the UAV 20. In other embodiments, the UAV 20 may take a different form, such as that of a traditional aeroplane, helicopter, airship, vertical take-off and/or landing aircraft, or balloon. Therefore, in other embodiments, the vehicle may comprise less than or more than four propulsion units 26a-d. In these embodiments, the vehicle comprises flight control surfaces such as rotors, elevators, ailerons, flaps, and propellers. The controller 21 may execute the instructions in the control signal by independently controlling each of the propulsion units 26a-d to increase or decrease the velocity of the UAV 20. The controller 21 is arranged to generate control signals to control the propulsion units 26a-d (or other flight control surfaces) to change the heading and/or orientation and/or altitude and/or attitude and/or velocity of the UAV 20 such that it follows the route stored in the memory 32 of the vehicle controller 30.

The UAV 20 further includes a sensor 23. The sensor 23 may be for gathering intelligence (for example, imagery intelligence) along a route, sensing objects to avoid, or for assisting a user when controlling the UAV 20 manually using the remote controller 10. The sensor 23 may be an optical camera, for example. The UAV 20 may additionally or alternatively comprise a radar, LIDAR or a signals intelligence device.

The UAV 20 includes a memory 22. The memory 22 may be a non-volatile memory such as read only memory (ROM), a hard disk drive (HDD) or a solid state drive (SSD). The memory 22 stores, amongst other things, an operating system. The memory 22 may include random access memory (RAM). RAM is used by the controller 21 for the temporary storage of data. The operating system may contain code which, when executed by the controller 21 in conjunction with RAM, controls operation of each of hardware components of the UAV 20.

While the antennas 25, 33 are respectively illustrated as being located outside the bodies of the UAV 20 and the vehicle controller 30, it would be understood that this is for illustrative purposes only and they may instead reside inside the respective bodies. The antennas 25, 33 may take any suitable form, such as etched antennas, monopole antennas, dipole antennas, blade antennas or patch antennas.

A method of controlling an unmanned vehicle, specifically but not exclusively a UAV 20, to follow a route (or in the specific embodiment, a flight plan) will now be described with reference to FIG. 3.

In a first step, S300, a flight control signal is received from a remote controller at a signal processor (controller 31) of a vehicle controller 30. The flight control signal is intended for the UAV 20, rather than the vehicle controller 30, and therefore the flight control signal is intercepted. The flight control signal contains instructions for the UAV 20 to perform a manoeuvre, such as to increase velocity or gain altitude.

At step S302, the signal processor uses a spectrum analyser, which may be a software module, to determine characteristics of the received flight control signal. The characteristics may include, frequency, channel, wavelength, gain, or amplitude, for example.

At step S304, a server 40 generates a flight plan. The flight plan may be generated by performing route deconfliction on a plurality of received or input flight plans. Object data may be received and used in generating the flight plan such that associated objects can be avoided. Alternatively, the flight plan may be manually entered by a user using a terminal.

The generated or input flight is transmitted to the associated vehicle controller 30 using its unique identifier. For example, a message containing the flight plan may be transmitted to the vehicle controller 30 on a data carrier with a serial number of the vehicle controller 30 in a packet header.

The vehicle controller 30 receives the generated flight plan through the antenna 33. The flight plan is stored in the memory 32 (i.e. a storage module). The controller 31 reads the memory 32 to receive the flight plan. Alternatively, the memory 32 may be preprogramed with the flight plan or receive it via a wired interface. In alternative embodiments again, the controller 31 generates its own flight plan based, for example, on live situational awareness data, and stores the flight plan in the memory 32. It would be understood that in the presently described embodiment, live situational awareness data may be used to modify a received flight plan in real time.

At step S306, the controller 31 uses the present known position, velocity, altitude and/or orientation of the UAV 20 to generate a control signal, or sequence of control signals, that will instruct it to follow the stored flight plan. The control signal(s) is/are transmitted to the UAV 20 in step S308 wirelessly. The control signals are generated to have the same characteristics as those determined in step S302 (i.e. the control signal received in step S302 and the control signal transmitted in step S308 are indistinguishable if they are carrying the same instruction. The may have the same frequency, for example, so that the UAV 20 can process both).

At step S310, the radio 24 of the UAV 20 receives the control signal from the vehicle controller 30. The radio 24 (i.e. signal processor) decodes the control signal to determine the manoeuvre instruction. The controller 21 then controls flight control surfaces, for example propulsion units 26a-d, to adjust such that the UAV 20 performs the instructed manoeuvre.

The order of the steps presented in FIG. 3 is not intended to be limiting. In other words, the steps may be carried out in a different order, or simultaneously, without deviating from the scope of the present invention. For example, step S304, where a flight plan is generated and received by the vehicle controller 30, may be performed before step S300, where a flight control signal is received from a handheld remote controller 10.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. An apparatus for controlling an unmanned aerial vehicle, the apparatus being moveable with the unmanned aerial vehicle, the apparatus comprising:
   a receiver for intercepting a first control signal transmitted from a remote controller intended for the unmanned aerial vehicle, the first control signal containing an instruction to perform a first manoeuvre;
   a memory for storing a route for the unmanned aerial vehicle to follow, wherein the route is based on an initial route input from an external device;

a processor configured to:
   determine characteristics of the first control signal intercepted by the receiver which was intended for the unmanned aerial vehicle, wherein the characteristics of the intercepted first control signal include at least one of a channel or a frequency on which the first control signal is transmitted from the remote controller; and
   generate a second control signal, wherein the second control signal comprises an instruction for the unmanned aerial vehicle to perform a second manoeuvre to follow the route, where in a first case the first manoeuvre is the same as the second manoeuvre and in a second case the first manoeuvre is different from the second manoeuvre; and
a transmitter configured to transmit the second control signal, arranged to have the determined characteristics including the at least one of a channel or a frequency on which the first control signal is transmitted from the remote controller, to the unmanned aerial vehicle.

2. The apparatus according to claim 1, comprising a navigation system for generating navigation data,
   wherein the transmitter is arranged to transmit the navigation data to a server, and the receiver is arranged to receive the route from the server.

3. The apparatus according to claim 1, wherein the processor is arranged to determine the route for the unmanned aerial vehicle to follow based on the initial route input from the external device and a current position of the unmanned aerial vehicle and store the route in the memory.

4. The apparatus according to claim 3, comprising at least one sensor, wherein determining the route for the unmanned aerial vehicle to follow comprises modifying either the initial route or a stored route based on data generated by the at least one sensor.

5. The apparatus according to claim 1, wherein the processor is arranged to receive a plurality of routes, determine the route for the unmanned aerial vehicle to follow by performing route deconfliction on the plurality of routes, and store the determined route in the memory.

6. The apparatus according to claim 1, comprising a coupling means for coupling the apparatus to an outside surface of the unmanned aerial vehicle.

7. The apparatus according to claim 6, wherein the coupling means comprises an adhesive layer.

8. A system for controlling an unmanned aerial vehicle, the system comprising:
   at least one apparatus according to claim 1; and
   at least one unmanned aerial vehicle for receiving the second control signal from the apparatus and carrying out the second manoeuvre instructed by the second control signal, a respective apparatus being coupled to a respective unmanned aerial vehicle.

9. The system according to claim 8, comprising a server configured to transmit each of a plurality of routes to a respective apparatus coupled to a respective unmanned aerial vehicle that will follow a respective route.

10. The system according to claim 9, wherein the server comprises a route deconfliction algorithm for performing route deconfliction on a plurality of routes and generating the route for the respective unmanned aerial vehicle to follow.

11. The system according to claim 10, wherein the server is configured to retrieve object data and use the object data to perform the route deconfliction, such that the unmanned aerial vehicle does not collide with objects associated with the object data when following the route.

12. The system according to claim 9 wherein the at least one apparatus is arranged to transmit navigation data relating to the respective unmanned aerial vehicle to the server; and the server being configured to use the navigation data relating to a plurality of unmanned aerial vehicles to extrapolate routes for those unmanned aerial vehicles, wherein performing route deconfliction comprises generating a route for an unmanned aerial vehicle which does not intersect any of the extrapolated routes.

13. The apparatus according to claim 1, wherein the processor comprises a spectrum analyser which is configured to determine the characteristics of the first control signal intercepted by the receiver.

14. A method of controlling an unmanned aerial vehicle, the method comprising:

receiving, an initial route from an external device;

intercepting a first control signal from a remote controller intended for the unmanned aerial vehicle by a vehicle controller which is moveable with the unmanned aerial vehicle, the first control signal containing an instruction to perform a first manoeuvre;

storing a route for the unmanned aerial vehicle to follow, the route stored is based on the initial route;

determining characteristics of the first control signal intercepted which was intended for the unmanned aerial vehicle wherein the characteristics include a frequency and/or channel on which the intercepted first control signal is transmitted and the determining of the characteristics comprises determining the frequency and/or channel on which the first control signal was transmitted;

generating a second control signal, wherein the second control signal comprises an instruction for the unmanned aerial vehicle to perform a second manoeuvre to follow the route, where in a first case the first manoeuvre is the same as the second manoeuvre and in a second case the first manoeuvre is different from the second manoeuvre; and transmitting the second control signal, arranged to have the determined characteristics including the at least one of a channel or a frequency on which the first control signal is transmitted from the remote controller, to the unmanned aerial vehicle.

15. The method according to claim 14, comprising mechanically coupling the vehicle controller to the unmanned aerial vehicle.

16. The method according to claim 14, comprising receiving the route for the unmanned aerial vehicle to follow wirelessly from a server, where the server receives the initial route from the external device.

17. The method according to claim 16, comprising transmitting navigation data to the server and using the navigation data to plan the route for the unmanned aerial vehicle to follow.

18. The method according to claim 14, comprising determining the route for the unmanned aerial vehicle to follow by performing route deconfliction on a plurality of routes and storing the determined route.

19. The method according to claim 18, comprising retrieving object data and using the object data to perform route deconfliction, such that the unmanned aerial vehicle does not collide with objects associated with the object data when following the route.

20. The method according to claim 14, comprising:

sensing at least one object in a path of the unmanned aerial vehicle using at least one sensor; and determining the route by modifying either the initial route or the stored route based on a location of the sensed at least one object such that the unmanned aerial vehicle does not collide with the at least one object.

21. The method according to claim 14, comprising receiving the second control signal and controlling the unmanned aerial vehicle to perform the second manoeuvre instructed by the second control signal.

* * * * *